(12) United States Patent
DeGrazia et al.

(10) Patent No.: US 8,395,651 B2
(45) Date of Patent: Mar. 12, 2013

(54) SYSTEM AND METHOD FOR PROVIDING A TOKEN IN A VIDEO ENVIRONMENT

(75) Inventors: Bradley R. DeGrazia, Seattle, WA (US); Alan D. Gatzke, Bainbridge Island, WA (US); Matthew R. Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 12/576,822

(22) Filed: Oct. 9, 2009

(65) Prior Publication Data

US 2011/0086618 A1 Apr. 14, 2011

(51) Int. Cl.
*H04N 7/14* (2006.01)

(52) U.S. Cl. ............... 348/14.02; 348/14.03; 348/14.01; 455/556.1

(58) Field of Classification Search .... 348/14.01–14.16; 715/863; 382/103; 455/466, 556.1
See application file for complete search history.

(56) References Cited

U.S. PATENT DOCUMENTS

| | | | |
|---|---|---|---|
| 6,538,676 B1 * | 3/2003 | Peters | 715/863 |
| 6,961,903 B2 | 11/2005 | Suzuki et al. | |
| 7,397,932 B2 | 7/2008 | McAlpine et al. | |
| 7,505,607 B2 | 3/2009 | Meunier et al. | |
| 2011/0014932 A1 * | 1/2011 | Estevez | 455/466 |
| 2011/0050720 A1 * | 3/2011 | Carter et al. | 345/593 |
| 2011/0063415 A1 * | 3/2011 | Gefen et al. | 348/43 |

OTHER PUBLICATIONS

DealTime, "Gyration Gyro Presenter (AS00209-001) Mouse," http://www4.dealtime.com/xPO-Gyration-GyroMouse-Presenter-AS00209-001; printed Oct. 9, 2009; 2 pages.
ZentropySoftware, "Pointer," http://www.zentropysoftware.com/ZS/Pointer.html; printed Oct. 9, 2009; 1 page.
IGN, "Wii Best of E3 2006 Awards," http://wii.ign.com/articles/709/709244p4.html; printed Oct. 1, 2009; 2 pages.

* cited by examiner

*Primary Examiner* — Melur Ramakrishnaiah

(57) ABSTRACT

A method is provided in one example embodiment and includes receiving video input data associated with a video stream and identifying one or more spatial plane coordinates within the video input data. The spatial plane coordinates can be associated with a smartphone configured to operate as a token in a video presentation associated with the video stream. The method also includes receiving location information that includes accelerometer data associated with the smartphone, and identifying a location of the smartphone based on the one or more spatial plane coordinates and the location information that includes the accelerometer data. In other embodiments, the method may include providing image data associated with a representation of the token as an overlay for a resultant video stream. The location information can include orientation data that includes a direction to which the smartphone can point, and an angle of rotation associated with the smartphone.

21 Claims, 4 Drawing Sheets

SYSTEM AND METHOD FOR PROVIDING A TOKEN IN A VIDEO ENVIRONMENT

TECHNICAL FIELD

This disclosure relates in general to the field of communications and, more particularly, to providing a token n a video environment.

BACKGROUND

The field of video communications has become increasingly important in today's society. In particular, the ability to effectively interact with an individual (through any suitable communications media) presents a significant obstacle for component manufacturers, system designers, and network operators. This obstacle is made even more difficult due to the plethora of diverse communication technologies that exist in the current marketplace. Video processing applications typically involve the capture and transmission of data. Interactive displays are increasingly becoming more common, as they offer flexibility to the audience and the presenter. As new communication platforms become available to the consumer, new protocols should be developed in order to optimize this emerging technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving video input data associated with a video stream and identifying one or more spatial plane coordinates within the video input data. The spatial plane coordinates can be associated with a smartphone configured to operate as a token in a video presentation associated with the video stream. The method also includes receiving location information that includes accelerometer data associated with the smartphone, and identifying a location of the smartphone based on the one or more spatial plane coordinates and the location information that includes the accelerometer data. In other embodiments, the method may include providing image data associated with a representation of the token as an overlay for a resultant video stream. The location information can include orientation data that includes a direction to which the smartphone can point, and an angle of rotation associated with the smartphone.

Example Embodiments

Figure 1:
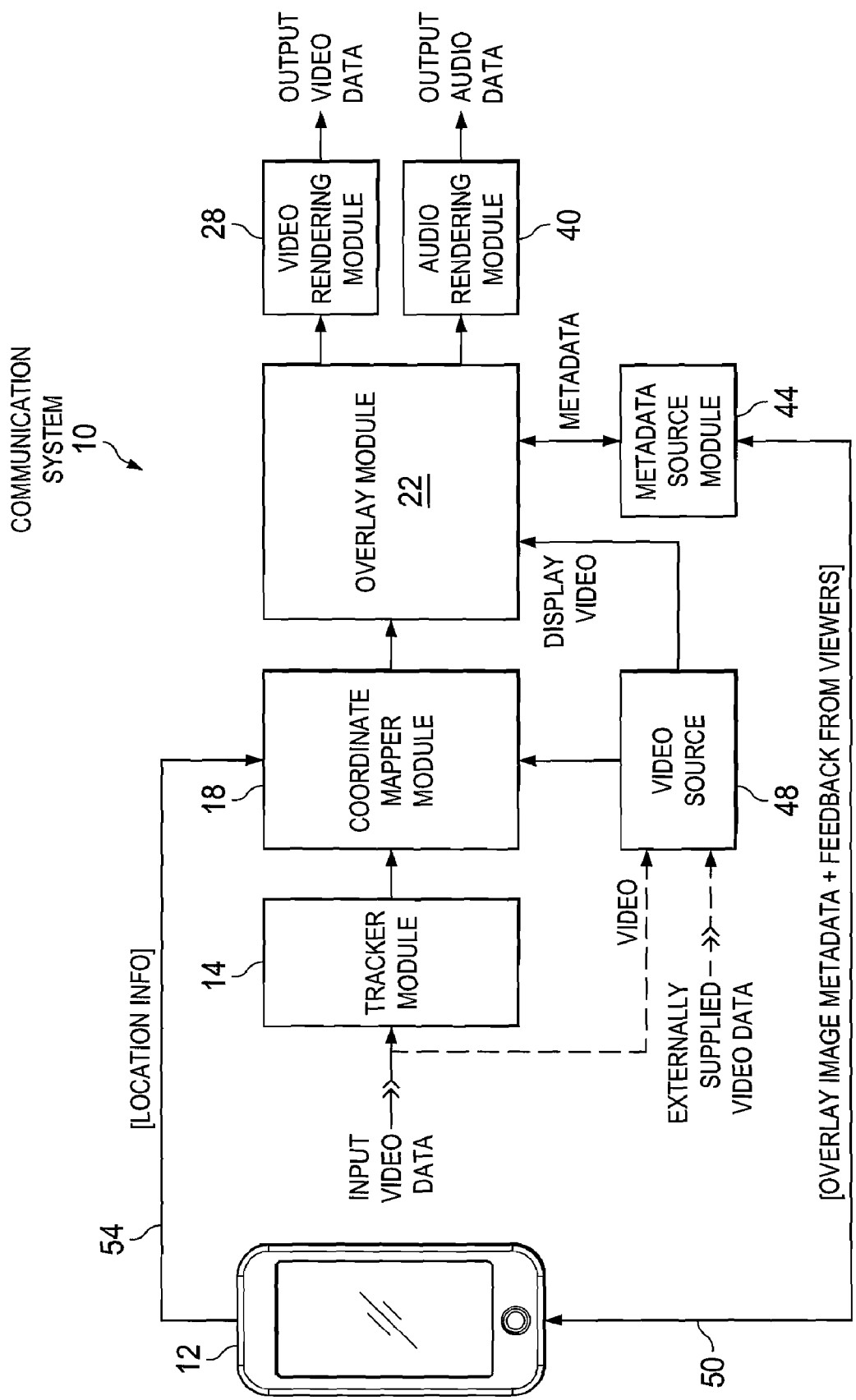
FIG. 1 is a simplified block diagram of a communication system for providing a token in a video imaging environment in accordance with one embodiment.

FIG. 1 is a simplified block diagram of a communication system 10 for providing a token in a video imaging environment. FIG. 1 includes a smartphone 12, a tracker module 14, a coordinate mapper module 18, an overlay module 22, a video rendering module 28, an audio rendering module 40, a metadata source module 44, and a video source 48. Smartphone 12 can be used in a tracking overlay video system as a token in example embodiments presented herein. The application running on smartphone 12 can be used as the source of the overlay image being superimposed and, further, the user can control the overlay image using menu selections provided in that smartphone application.

The token can be used to pinpoint where data (such as statistics, graphs, charts, pictures, etc.) is superimposed on top of an output video stream. Communication system 10 can overlay an image containing presentation material on top of coordinates defined by the token. In order to enhance the ability to identify the token's exact location, smartphone 12 can be leveraged to provide additional information regarding its location (e.g., accelerometer data, orientation data, etc.). Coordinate mapper module 18 can determine the token's exact location based on the received video input and this additional location information. In addition, in one example implementation (and to simplify the architecture), smartphone 12 could contain (or transmit) the actual data being superimposed on the video stream.

Tracker module 14 can use a video input source to help identify smartphone 12. In addition to the video input, smartphone 12 can use Bluetooth pairing, the wireless Internet Protocol (IP) network, etc. to establish a viable data connection between smartphone 12 and the tracking system (e.g., coordinate mapper module 18). An application running on smartphone 12 could then use location technology (discussed below), along with accelerometer data to offer enhanced location information, orientation information, rotation information, etc. Empowered with this information, coordinate mapper module 18 can combine the video input (e.g., simple coordinates in a spatial plane) and the location information to accurately pinpoint the location of the token within the video being captured. The application running on smartphone 12 can be configured to send the video images to be superimposed on the video at that moment in time. The user could use an application (e.g., provided within smartphone 12) to select which image to send and, further, when to start and to stop the overlay. The output video could show the person holding smartphone 12, where the audience could see the overlay image rather than the actual smartphone.

Along with the overlay image data, smartphone 12 could also send additional metadata to overlay module 22. The metadata could be preloaded by the presenter and then distributed when smartphone 12 (i.e., the token) was put in use. For example, if a company executive is presenting quarterly numbers, he may want to attach a website URL or a JPEG URI to various tokens. Then, as different tokens were employed during the presentation, additional data would be presented to viewers of the presentation. Devices (or clients having network connections to the output video stream) can determine how they could use/present this additional data. For example, a video client could show small graphic icons next to the tokens that are active in the video stream.

By providing multiple sources of data to coordinate mapper module 18, a more accurate identification of the location of smartphone 12 is provided. In addition, such a model can eliminate the need for a special purpose token (wand), as smartphone 12 can readily be used in its place. Additionally, where smartphone 12 is the video source, a simplistic solution is provided. As a separate notion, communication system 10 can allow the user to have a feature-rich interface on the token for controlling the tracking overlay system. For example, a typical wand device can be used as the token to generate different colored lights. In one instance, a green color can be displayed when the user wants to start the overlay and perhaps a red color can be used when the user wants to stop the overlay. Tracker module 14 can detect these different colored lights and react to those user commands. However, in addition to these features, communication system 10 can additionally allow the user to select any number of menu options in a smartphone application. Those respective commands can be sent via the data connection between smartphone 12 and the tracking overlay system.

Communication system 10 can recognize a token having a unique shape, form, identifier, or color to permit the architecture to distinguish it from other content in a captured video data stream. For example, a token may simply be a colored object having a predetermined shape or symbol. In one example, coordinate mapper module 18 may identify smartphone 12 operating as a token by processing multiple pieces of information (e.g., location data). The location data may include accelerometer data, global positioning system (GPS) data, and triangulation data, as detailed below with reference to FIG. 2.

Note that before turning to the example flows and infrastructure of example embodiments of the present disclosure, a brief overview of the video architecture is provided. The components of the video architecture of FIG. 1 can use technologies in conjunction with specialized applications and hardware to create a solution that can leverage the network. This video architecture can use IP technology and operate on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all participants can be provided. Participants can use their end-user devices to access (or receive video data from) a Meeting Place application, a WebEx session, a simple web session, etc.

Smartphone 12 can be used by a presenter wishing to participate in a video presentation in communication system 10. The term 'smartphone' may be inclusive of devices used to initiate any type of communication, such as an iPhone, a console, a proprietary endpoint, a cellular telephone, a computer, a personal digital assistant (PDA), a laptop or an electronic notebook, or any other device, component, element, or object capable of initiating or facilitating video, audio, or data exchanges within communication system 10.

Smartphone 12 may also be inclusive of a suitable interface to the human user, such as a microphone, a display, or a keyboard or other terminal equipment. Smartphone 12 may also include any device that seeks to initiate a communication on behalf of another entity or element, such as a program, a database, or any other component, device, element, or object capable of initiating a voice, a video, or a data exchange within communication system 10. Data, as used herein in this document, refers to any type of video, numeric, voice, or script data, or any type of source or object code, or any other suitable information in any appropriate format that may be communicated from one point to another.

Smartphone 12 can utilize several arrangements to offer a presentation to multiple participants in an audience. For example, smartphone 12 could be the actual device that executes or delivers the presentation and, therefore, smartphone 12 can be configured to provide the presentation itself. The presentation may be provided along with overlay image metadata, as well as additional data (e.g., web data, URLs, etc.), which may be displayed. For example, smartphone 12 may store and execute a file to be used in the presentation, or smartphone 12 may have an electronic coupling to an existing network resource to be used for the presentation. Smartphone 12 is also capable of suitably connecting to any appropriate server that may facilitate execution of the presentation.

In another example, a separate video source 48 (along with externally supplied video data) can be used in order to generate image data to be presented to the audience. In such an example, some of the processing overhead is removed from smartphone 12 such that an external video source is used to run the base presentation for the audience. In such an instance, smartphone 12 is providing the overlay image data, along with additional information to be seen by the audience, whereas video source 48 is responsible for executing the presentation. In another example, a presenter using smartphone 12 can provide metadata to a network resource. Based on simple processing demands or bandwidth constraints, streaming the video may be difficult to do using smartphone 12; however, the presenter may enter a Web address (such as a URL), which may allow smartphone 12 to used in conjunction with a selected network resource.

Also depicted in FIG. 1 is a transport pathway 54 that propagates location information from smartphone 12 to coordinate mapper module 18. In addition, overlay image metadata and feedback from viewers is provided by a bidirectional pathway 50, which couples smartphone 12 and metadata source module 44. In such an instance, metadata may be sent from metadata source module 44 to overlay module 22. In addition, such a pathway illustrates how participants in a video presentation can provide feedback based on the composite images being shown during the video presentation. Thus, smartphone 12 can afford a certain level of interaction between the presenter and the viewers. For example, there could be four or five smartphone tokens running simultaneously and the presenter could be asked for feedback about which token is preferred by the viewers. This could further involve a simple thumbs up/thumbs down button or an icon (for voting purposes), which can be provided next to each token. Users could interact with the video without having to support a complex shell interface. In one example, a participant may provide feedback to the presenter that he should slow down or speed up the presentation. Another cue could be given to the presenter to address a question from one of the participants. In essence, the audience has a mechanism to offer feedback to the presenter in real time.

In some of these cases, a server component (e.g., a server that included tracker module 14, coordinate mapper module 18, and/or overlay module 22), could mix the video signal, apply graphics, and send it out to participants with basic hot-spot maps for the client to process. This would offer the benefit of having reduced client overhead, as the bulk of processing would occur at the presentation site before propagating the video data over the network.

In another example, overlay module 22 can freeze its current image data being projected to the audience such that the presenter has ample time to address (or otherwise identify) feedback being received by smartphone 12. In one instance, the application that is running during the presentation may be leveraged in order to deliver feedback from the audience. For example, if the presentation were involving a video conferencing protocol (e.g., WebEx conference, Meeting Place conference, etc.), those applications, which would be running on smartphone 12, could deliver commentary to smartphone 12.

Turning to the infrastructure of FIG. 1, tracker module 14 can perform data analysis on video input image data. In specific embodiments, tracker module 14 attempts to identify (within the image data) the location of smartphone 12. For example, a user of smartphone 12 may be presenting to a group of individuals. The image data can include the person himself, along with furniture in the room (e.g., a podium, the walls, etc.). One function provided by tracker module 14 is the ability to identify smartphone 12, which is operating as a token, within this image data. In essence, this tracking activity intelligently finds the image data corresponding to smartphone 12. The ability to find smartphone 12 can implicate several pieces of information.

Tracker module 14 can identify smartphone 12 as the token from the input video data and, subsequently, associate one or more coordinates to it in an appropriate spatial domain of the video data. The coordinates identify the token's location in the input video data from which it was identified. Tracker module 14 outputs the token's coordinates to coordinate mapper module 18. In one example implementation, coordinate mapper module 18 cooperates with tracker module 14 in order to pinpoint the location for smartphone 12. Hence, coordinate mapper module 18 is continuously updating system information in order to identify the location of smartphone 12 within the image data. This may include the reception of accelerometer data, GPS data, triangulation data, and/or orientation information (for example, which direction smartphone 12 is pointing, how it is being held, its current positioning, its angle of rotation, etc.). All of these data sets are generally included within the broad term 'location information' as used herein in this Specification.

According to an embodiment, communication system 10 is depth aware. The token can be resolved into x, y, z coordinates representing the token's position in the various spatial planes (i.e., domains or dimensions). In operation, tracker module 14 can recognize the token (e.g., its location, shape, size, and/or color). Based on this information, tracker module 14 may determine a distance of the token from a video input device. Tracker module 14 can output the token's distance coordinates to coordinate mapper module 18. Coordinate mapper module 18 can map the token's distance coordinates to a display coordinate system. Overlay module 22 can receive associated metadata and, if present, use the depth information to overlay the token on the display.

A depth-sensitive overlay system may provide enhanced functionality. Metadata may be arranged into layers, each having a particular depth. In an embodiment, overlay module 22 may also overlay an icon on the video data identifying the token's position in the display domain. The icon may function as a cursor in some computing applications providing feedback to the user. In another embodiment, tracker module 14 may output additional information related to a specific token. The token's orientation may be represented by three degrees of rotation. Again, tracker module 14 may recognize and represent various attributes of the token, such as its unique identifier, pattern, etc. For example, a square token may include predetermined patterns that can be used to distinguish one token type from another.

In addition to the video input data, location information (from pathway 54) is being fed to coordinate mapper module 18. That location information may be provided relative to other objects in the room in one example embodiment. In one general sense, this location information is being provided out-of-band (e.g., Bluetooth, WiFi, Ethernet, infrared, any suitable 802.XX protocol, etc.), or independently in that it can be provided separate from the video data being fed to tracker module 14. Additionally, smartphone 12 may be equipped with an accelerometer (as detailed in FIG. 2) that allows orientation information to be provided to coordinate mapper module 18. All this information may be used to enhance the ability to locate smartphone 12 within the video data.

Tracker module 14 may be configured to recognize and distinguish multiple tokens (along with details about each of the tokens). For example, tracker module 14 also may be configured to output a code representing a specific token type. In one application, smartphone 12 can emit light of multiple colors, where tracker module 14 may be configured to discriminate among the different colors and output a code representative of the color that is identified.

Coordinate mapper module 18 may resolve coordinate data from tracker module 14 into a coordinate system of the base layer video data. Coordinate mapper module 18 may perform coordinate resolution using any number of suitable techniques. Coordinate mapper module 18 receives image data from tracker module 14, video source 48, and location data from smartphone 12 in order to calculate the location of the token in the domain of the display video data. Thus, coordinate mapper module 18 determines a position of the token in the video data based on the token's position in the captured video. Coordinate mapper module 18 outputs the precise location of the token to overlay module 22. Coordinate mapper module 18, according to an embodiment, may also pass token type information and other semantic data to overlay module 22.

Video source 48 receives external video data as the base layer video data in conjunction with an application calling for metadata to be overlaid on other visual content.

Video source 48 also may perform simple manipulations of the input data (e.g., subtracting out a background, modifying certain objects, removing the speaker from the presentation where appropriate, etc.). Video source 48 can forward selected video data to coordinate mapper module 18. Video source 48 may also pass display video to overlay module 22.

Overlay module 22 can receive display video data, metadata, and location data from coordinate mapper module 18 and, subsequently, use some or all of the information to generate a composite video image. Overlay module 22 can determine whether the token's position coincides with the region occupied by the metadata. If so, overlay module 22 can include the selected metadata in the composite image. Overlay module 22 outputs video data representing the composite video image to a device that can further propagate the composite image, or suitably render the composite image. In one example, both the token and metadata each may occupy an area. Portions of the metadata area that coincide with the area occupied by the metadata may be overlaid on the base layer video data. In another example, overlay module 22 may determine whether a token implicates metadata with reference to type codes associated with the data. For example, the metadata itself may be associated with token codes. In such an embodiment, the metadata would be implicated if the token's position coincided with the position of the metadata and if the token's type code agreed with the type codes associated with the metadata. In another embodiment, overlay module 22 may determine how much metadata to display based on the depth of the token.

Video rendering module 28 outputs the video data from the overlay system. Video rendering module 28 may be indirectly, or directly, connected to a video output device (such as a display, a cable, a network connection, etc.). In such an embodiment, video rendering module 28 may include appropriate software drivers for the video output device. Alternatively, video rendering module 28 may output the video data to a communication channel provided by a device or a computer network. In such an implementation, video rendering module 28 includes communication interface elements to interact or suitably couple communication system 10 to the network.

In another embodiment, communication system 10 may operate to track one or more tokens from several streams of video data. In such an example, tracker module 14, coordinate mapper module 18, and overlay module 22 can be replicated to accommodate several input video data streams. In addition, as illustrated in FIG. 1, the principles of communication system 10 are suitable for use with metadata associated with video, audio, or a hybrid of audio-visual content. According to an embodiment, communication system 10 may include audio rendering module 40 that drives audio devices for certain applications.

Metadata source module 44 can receive metadata from smartphone 12 (e.g., via a memory element of smartphone 12, a communication channel that may be wired or wireless, etc.). Metadata source module 44 may format the metadata as necessary to provide the metadata in a form that may be processed by overlay module 22. Overlay module 22 can determine whether the token implicates metadata from metadata source module 44. In a first embodiment, metadata may be identified by spatial areas that they occupy. For example, the metadata elements may be identified by origin coordinates in the display domain and lengths and widths or, alternatively, by coordinates of opposing boundaries. Overlay module 22 may determine whether the token falls within the area defined for any metadata and, if so, selects the metadata to overlay the video data.

In an alternative embodiment, overlay module 22 may define a token to occupy a predetermined area. Metadata elements may similarly occupy a preselected or designated area. Overlay module 22 may determine whether any metadata area coincides with the area of a token and, if this occurs, it is configured to reveal the coincident metadata. In such an example, the token operates as a window, where moving the window around allows a user to reveal underlying metadata. Tracker module 14, in an embodiment, can assign a size or depth to a recognized token based on the token's size in the image data (e.g., the token's size can correspond to its depth (i.e., its distance from a camera when it is first captured as video data)). Overlay module 22 may receive a size or depth indicator from tracker module 14 indirectly through coordinate mapper module 18. In this embodiment, different pieces metadata may be implicated if the token's three-dimensional position coincides with a volume occupied by the metadata in the domain of the base layer video data. Additional operational capabilities of communication system 10 are detailed below with respect to FIGS. 2-4.

Figure 2:
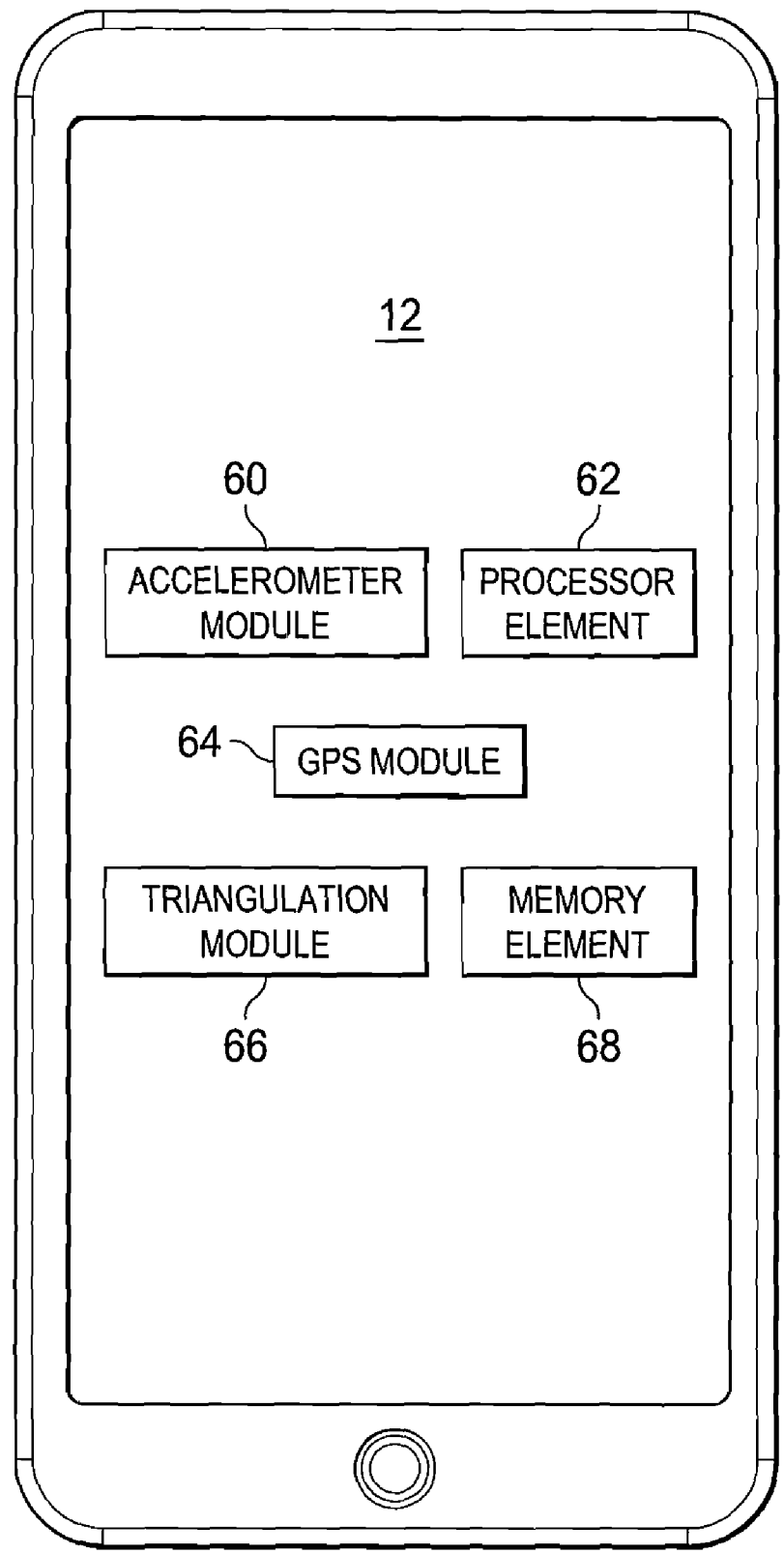
FIG. 2 is a simplified block diagram of a smartphone that can be used in the communication system in accordance with one embodiment.

Turning to FIG. 2, FIG. 2 is a simplified schematic diagram of smartphone 12 in accordance with one example implementation. Smartphone 12 may include an accelerometer module 60, a processor element 62, a GPS module 64, a triangulation module 66, and a memory element 68. Accelerometer module 60 can provide real-time granular location information to any suitable destination. This information may be three-dimensional in offering precise information about the orientation of smartphone 12. GPS module 64 may gather, process, receive, or provide GPS coordinates for smartphone 12. Note that wireless access points (for example, within a building, delivered via a WiFi hotspot, etc.) may also be used to glean location data for smartphone 12. Thus, triangulation module 66 may be used in conjunction with objects within the environment to provide a mechanism for identifying location data for smartphone 12. This could occur when signal strength associated with GPS module 64 is weak or otherwise limited.

The triangulation operations could involve real-time locating systems, which are used to track and identify the location of objects using simple, inexpensive nodes attached to (or embedded in) objects and devices. The objects and devices may receive the wireless signals to determine locations for smartphone 12. This could involve wireless local area network (WLAN), WiFi, or beacon technologies, or other suitable mechanisms that use some form of triangulation to help identify a location for smartphone 12.

These choices about which technology to use to aid in identifying the location of smartphone 12 may be based on a particular environment in which smartphone 12 is operating. For example, if smartphone 12 is operating within a Wi-Fi network, triangulation module 66 may not be necessary. In other scenarios, GPS module 64 and triangulation module 66 may simply be used to enhance the data, or to further confirm incoming location data. By using multiple sources of information, optimal location information associated with smartphone 12 can be provided to coordinate mapper module 18.

In one example, video source 48 is also providing its location information to coordinate mapper module 18. Any type of geo-tagging protocol could be used in sending this location information to coordinate mapper module 18. Note that the same functionality could be provided by a simple camera (such as a camera that could be provided in video source 70 of FIG. 3) such that location information from smartphone 12 and the camera is provided to coordinate mapper module 18. The distance between smartphone 12 and video source 70 can be calculated based on operations being performed by coordinate mapper module 80, which can receive real-time data associated with each device and make appropriate comparisons to determine the distance between them. Thus, in one example, the location information being provided by video source 70 and smartphone 12 may be combined with operations being performed to identify specific images within video data in an effort to better determine the location of smartphone 12. Video source 70 may also send its current zoom level and focus level (e.g., in real time) to coordinate mapper module 80. This too would improve the quality in identifying the location of smartphone 12 using coordinate mapper module 80. Additional details relating to these activities are described below with reference to FIG. 3.

Figure 3:
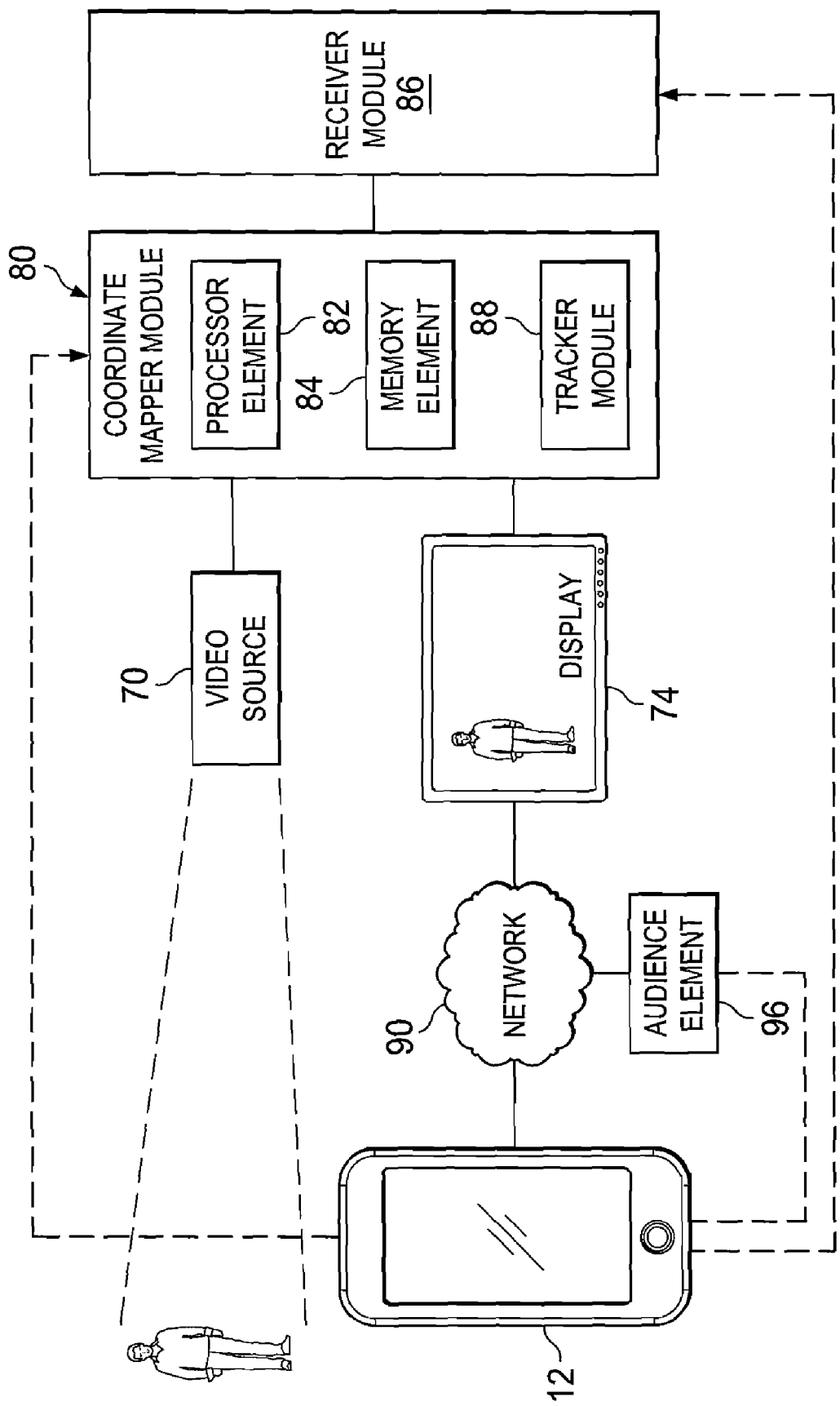
FIG. 3 is a simplified block diagram of a communication system for providing a token in a video imaging environment in accordance with another embodiment.

FIG. 3 is a simplified block diagram of an example arrangement associated with communication system 10. FIG. 3 includes smartphone 12, a video source 70, a display 74, a coordinate mapper module 80 (which includes a processor element 82, a memory element 80, and a tracker module 88), a receiver module 86, a network 90, and an audience element 96. The dashed line from smartphone 12 to receiver module 86 represents the ability of smartphone 12 to deliver metadata to receiver module 86. In addition, the dashed line from smartphone 12 to audience element 96 represents the ability of the audience to provide feedback to the presenter, as explained above. Receiver module 86 is part of the overlay function detailed herein, where the resultant image data may be sent over a network and, for example, shown at devices connected to any suitable network (e.g., display 74). In other instances, display 74 is provided proximate to the end user operating smartphone 12 such that he can see his own presentation in real time. In this sense, the end user is empowered to see the ultimate image data being shown to the audience and, further, to adjust his presentation based on this real-time feedback.

Network 90 represents a series of points or nodes of interconnected communication paths for receiving and transmitting packets of information that propagate through communication system 10. Network 90 offers a communicative interface between end users (and/or endpoints) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. Network 90 can implement a transmission control protocol (TCP)/Internet Protocol (IP) communication language protocol in a particular embodiment of the present disclosure; however, network 90 may alternatively implement any other suitable communication protocol for transmitting and receiving data packets within communication system 10. Note also that network 90 can accommodate any number of ancillary activities, which can accompany a video presentation. For example, this network connectivity can facilitate all informational exchanges (e.g., virtual white boards, PowerPoint presentations, e-mailing, texting, word processing applications, etc.).

Note that the user of smartphone 12 can temporarily lock any modules associated with the device such that image data can be paused or frozen momentarily. For example, an accelerometer lock could be used in order to freeze a given image for purposes of emphasizing that particular image during the presentation. Then the user could simply unlock the accelerometer and move forward in the presentation. Other examples could involve a quick pausing of the accelerometer functions in order to graphically pull other images up for purposes of discussion.

Software for accurately identifying the location of the token (smartphone 12) can be can be provided at various locations. In one example implementation, this software is resident in a server, which includes coordinate mapper module 80 and/or tracker module 88. In other examples, this identification/processing function could involve a proprietary element, which could be provided in (or be proximate to) these identified servers, or be provided in any other device being used by a given end user in a presentation scenario, or be provisioned somewhere else in the network. The identification software can use multiple sources of location data to accurately identify the location of smartphone 12. As used herein in this Specification, the term 'server' is meant to encompass routers, switches, bridges, gateway, processors, loadbalancers, firewalls, or any other suitable device, component, element, or object operable to exchange or process information in a network environment. Moreover, these servers may include any suitable hardware, software, components, modules, interfaces, or objects that facilitate the operations thereof. This may be inclusive of appropriate algorithms and communication protocols that allow for the effective exchange of data or information. Coordinate mapper 80 and/or tracker module 88 can be consolidated in any suitable manner. Along similar design alternatives, any of the illustrated modules and components of FIGS. 1, 2, and 3 may be combined in various possible configurations.

In other embodiments, the identification feature may be provided external to a server, or included in some other network device, or in a computer (e.g., a personal computer) to achieve these intended functionalities. Alternatively, both of these elements (the personal computer and the server) can include this software (or reciprocating software) that can coordinate in order to achieve the identification operations outlined herein. In still other embodiments, one, two, or all of these devices may include any suitable algorithms, hardware, software, components, modules, interfaces, or objects that facilitate the operations thereof.

In certain example implementations, the identification functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 3) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., a server, smartphone 12, etc.) can include memory elements for storing information to be used in achieving the transitioning operations as outlined herein. Additionally, each of these devices may include a processor that can execute software or an algorithm to perform the identification activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the servers, modules, and smartphone 12 can also include suitable interfaces for receiving, transmitting, and/or otherwise communicating data or information in a network environment.

Figure 4:
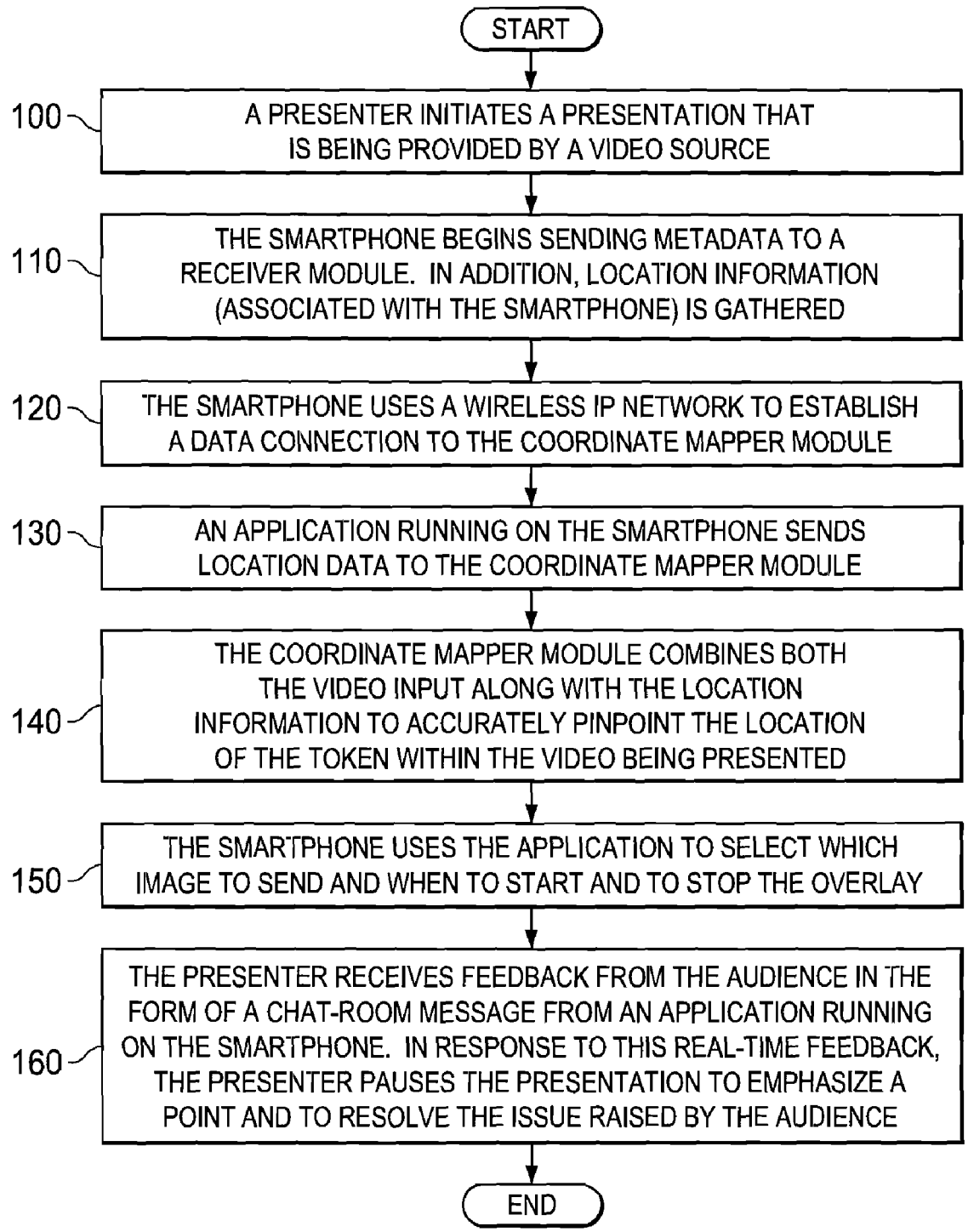
FIG. 4 is a simplified flowchart illustrating a series of example steps associated with the communication system.

FIG. 4 is a simplified flowchart illustrating example steps associated with communication system 10. This flow is being provided in conjunction with the discussion of the infrastructure of FIG. 3. The method begins at step 100, where a presenter initiates a presentation that is being streamed from video source 70. At step 110, smartphone 12 begins sending metadata to receiver module 86. In addition, location information (associated with smartphone 12) is being gathered such that it can be sent to coordinate mapper module 80. Tracker module 88 receives information from video source 70 and continues to pass this along to an overlay mechanism, which is part of receiver module 86.

At step 120, smartphone 12 (in this example) uses a wireless IP network to establish a data connection to coordinate mapper module 80. At step 130, an application running on smartphone 12 collects accelerometer data, GPS data, and triangulation data. This information is passed to coordinate mapper module 80. Coordinate mapper module 80 combines both the video input along with the location information to accurately pinpoint the location of the token within the video being presented. This is reflected by step 140.

The application running on smartphone 12 can send the tracking mechanism the actual image to be superimposed on the video at that moment in time. The user could use a smartphone 12 application to select which image to send and when to start and stop the overlay, as shown in step 150. In this example, the speaker is reviewing a quarterly financial report, where the presenter is able to physically grab a pie chart, bar graphs, etc. and move these items to a different space on the screen relative to the presenter's body (by simply moving smartphone 12). Additionally, the system can be configured to follow the presenter around the room. In this example, in addition to the video signal, coordinate mapper module 18 elects to use accelerometer data and wireless triangulation data to better identify the location of the token (i.e., smartphone 12). At step 160, the presenter receives feedback from the audience in the form of a chat-room message from an application running on smartphone 12. In response to this real-time feedback, the presenter pauses the presentation to emphasize a point and to resolve the issue raised by the audience.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) is readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures. In addition, communication system 10 has been described herein as operating on only a single token recognized from a single stream of input data. In an embodiment, communication system 10 may be configured to overlay metadata on video in response to multiple tokens. In this embodiment, tracker module 14, coordinate mapper module 18, and overlay module 22 apply the processing performed for a single token to multiple tokens.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
   identifying a presence and a location of a smartphone in input video data, wherein the smartphone is configured to operate as a token whose location is to be tracked;
   receiving location information from the smartphone indicating the smartphone's location;
   determining a location of the smartphone relative to base layer video data based on the location identified from the input video data and the location information received from the smartphone; and
   generating output video data comprising the base layer video data and overlay image data superimposed on the base layer video data, wherein the overlay image data is positioned within the output video data based on the location of the smartphone determined relative to the base layer video data.

2. The method of claim 1, wherein the base layer video data comprises the input video data.

3. The method of claim 1, wherein the location information received from the smartphone includes orientation data associated with the smartphone, and wherein the orientation data includes a direction to which the smartphone can point, and an angle of rotation associated with the smartphone.

4. The method of claim 1, wherein the overlay image data is received from the smartphone and is controllable via the smartphone.

5. The method of claim 1, wherein the location information received from the smartphone includes accelerometer information.

6. The method of claim 1, wherein the location information received from the smartphone includes triangulation data associated with the smartphone, or global positioning system (GPS) data associated with the smartphone.

7. The method of claim 1, further comprising:
   supplying the output video data to the smartphone while receiving the input video data from the smartphone.

8. Logic encoded in one or more tangible media that includes code for execution and when executed by a processor operable to perform operations comprising:
   identifying a presence and a location of a smartphone in input video data, wherein the smartphone is configured to operate as a token whose location is to be tracked;
   receiving location information from the smartphone indicating the smartphone's location;
   determining a location of the smartphone relative to base layer video data based on the location identified from the input video data and the location information received from the smartphone; and
   generating output video data comprising the base layer video data and overlay image data superimposed on the base layer video data, wherein the overlay image data is positioned within the output video data based on the location of the smartphone determined relative to the base layer video data.

9. The logic of claim 8, wherein the base layer video data comprises the input video data.

10. The logic of claim 8, wherein the overlay image data is received from the smartphone and is controllable via the smartphone.

11. The logic of claim 8, wherein the location information received from the smartphone includes orientation data associated with the smartphone, and wherein the orientation data includes a direction to which the smartphone can point, and an angle of rotation associated with the smartphone.

12. The logic of claim 8, wherein the location information received from the smartphone includes triangulation data associated with the smartphone, or global positioning system (GPS) data associated with the smartphone.

13. The logic of claim 8, the processor being operable to perform further operations comprising:
   supplying the output video data to the smartphone while receiving the input video data from the smartphone.

14. The logic of claim 8, wherein the location information received from the smartphone includes accelerometer information.

15. An apparatus, comprising:
a tracker module configured to identify a presence and location of a smartphone in input video data, wherein the smartphone is configured to operate as a token whose location is to be tracked;
a coordinate mapper module configured to determine a location of the smartphone relative to base layer video data based on: the location identified by the tracker module from the input video data and location information received from the smartphone; and
an overlay module configured to generate output video data comprising the base layer video data and overlay image data superimposed on the base layer video data, wherein the overlay image data is positioned within the output video data based on the location of the smartphone determined relative to the base layer video data.

16. The apparatus of claim 15, wherein the base layer video data comprises the input video data.

17. The apparatus of claim 15, wherein the overlay image data is received from the smartphone and is controllable via the smartphone.

18. The apparatus of claim 15, wherein the location information received from the smartphone includes orientation data associated with the smartphone, and wherein the orientation data includes a direction to which the smartphone can point, and an angle of rotation associated with the smartphone.

19. The apparatus of claim 15, wherein the location information received from the smartphone includes triangulation data associated with the smartphone, or global positioning system (GPS) data associated with the smartphone.

20. The apparatus of claim 15, wherein the location information received from
the smartphone includes accelerometer information.

21. The apparatus of claim 15, wherein the apparatus is configured to supply the output video data to the smartphone while receiving the input video data from the smartphone.

* * * * *